United States Patent [19]

Marti

[11] 4,391,002
[45] Jul. 5, 1983

[54] WATER-CLOSET FOR VEHICLES, PARTICULARLY MOTOR COACHES

[75] Inventor: Ernst Marti, Kallnach, Switzerland

[73] Assignee: Karl Kassbohrer Fahrzeugwerke GmbH, Ulm, Fed. Rep. of Germany

[21] Appl. No.: 172,197

[22] Filed: Nov. 13, 1980

[30] Foreign Application Priority Data

Jul. 26, 1979 [DE] Fed. Rep. of Germany ....... 2930403

[51] Int. Cl.³ .............................................. E03D 1/00
[52] U.S. Cl. .......................................... 4/321; 4/322; 4/306; 210/221.2; 210/150
[58] Field of Search .................... 4/321, 322, 323, 317, 4/318, 320, 306, 213, 596, 598; 210/221.1, 221.2, 150, 151

[56] References Cited

U.S. PATENT DOCUMENTS

| | | | |
|---|---|---|---|
| 2,894,265 | 7/1959 | Reardon | 4/598 |
| 3,446,488 | 5/1969 | Mail et al. | 210/221.2 X |
| 3,509,999 | 5/1970 | Reid et al. | 4/458 X |
| 3,612,278 | 10/1971 | Dieterich | 4/458 X |
| 3,615,010 | 10/1971 | Reid et al. | 4/458 X |
| 3,616,913 | 11/1971 | Reid et al. | 4/458 X |
| 3,666,103 | 5/1972 | Green | 4/319 |
| 3,731,490 | 5/1973 | Sargent et al. | 4/458 X |
| 3,775,978 | 12/1973 | Body | 4/458 X |
| 3,788,478 | 1/1974 | Savage | 210/221.1 X |
| 3,833,943 | 9/1974 | Sturtevant | 4/458 X |
| 3,882,799 | 5/1975 | Sargent et al. | 4/458 X |
| 3,925,827 | 12/1975 | Wagenhals | 4/458 X |
| 3,933,629 | 1/1976 | Smith | 210/150 X |
| 3,936,888 | 2/1976 | Sturtevant | 4/458 X |
| 3,947,359 | 3/1976 | Laurie | 210/221.2 |
| 3,956,128 | 5/1976 | Turner | 210/221.2 X |
| 4,093,539 | 6/1978 | Guarino | 210/151 X |
| 4,117,044 | 9/1978 | Durda et al. | 210/221.2 X |
| 4,232,406 | 11/1980 | Beeghly et al. | 4/213 |
| 4,290,979 | 9/1981 | Sugiura | 210/221.2 X |
| 4,337,151 | 6/1982 | Crosby | 210/221.2 X |

Primary Examiner—Henry K. Artis
Attorney, Agent, or Firm—Finnegan, Henderson, Farabow, Garrett & Dunner

[57] ABSTRACT

An aerating system for faecal matter collected in a container in a vehicle which includes a pressurized air system for operating brakes, doors, ventilation flaps and the like. The pressurized air system includes a tank and a compressor which operates continuously during operation of the vehicle engine and a regulator which exhausts excess air to a bypass duct when the tank is at its operating pressure. A tube connects the container to the bypass duct so that faecal matter in the container is substantially continuously aerated during vehicle engine operation.

4 Claims, 2 Drawing Figures

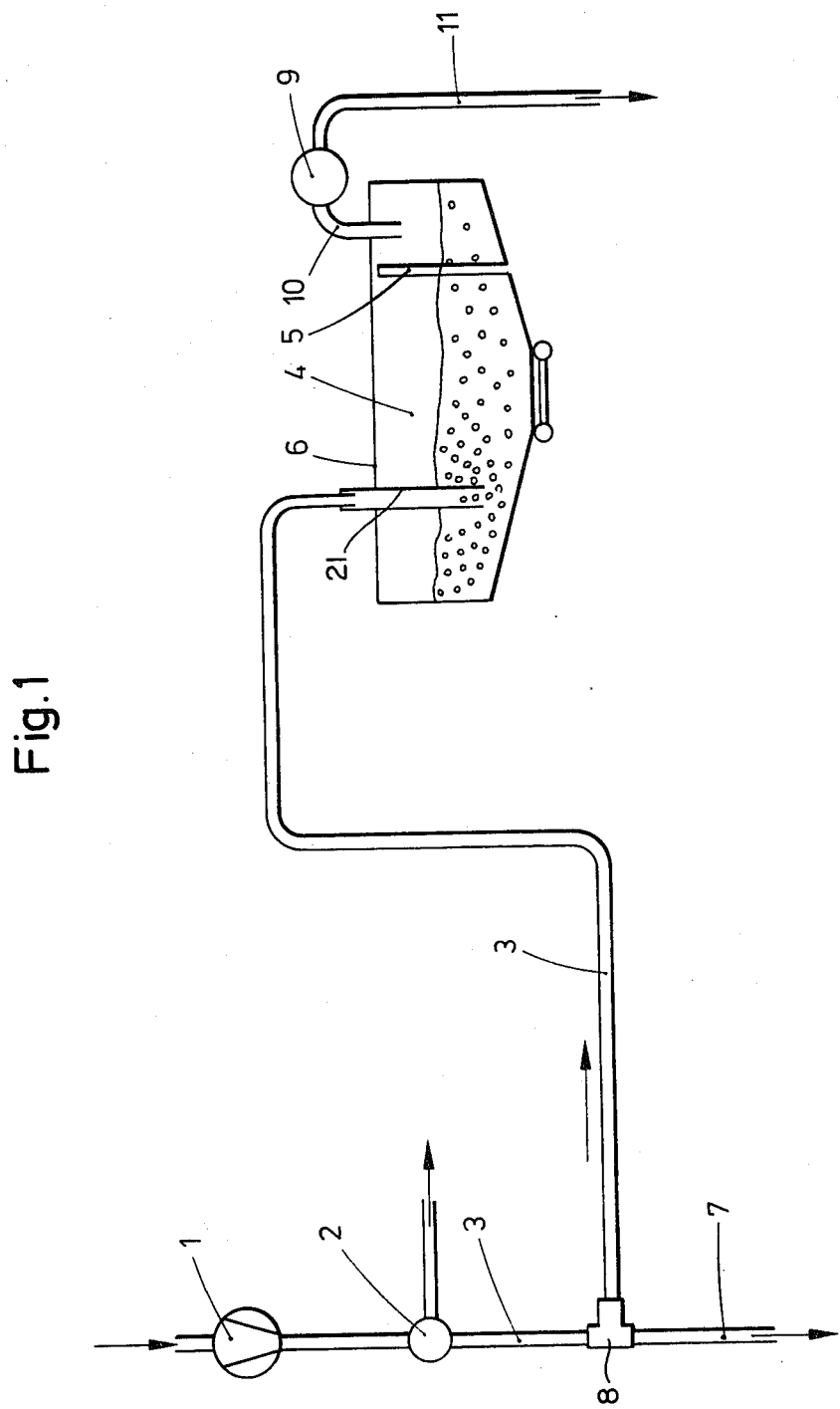

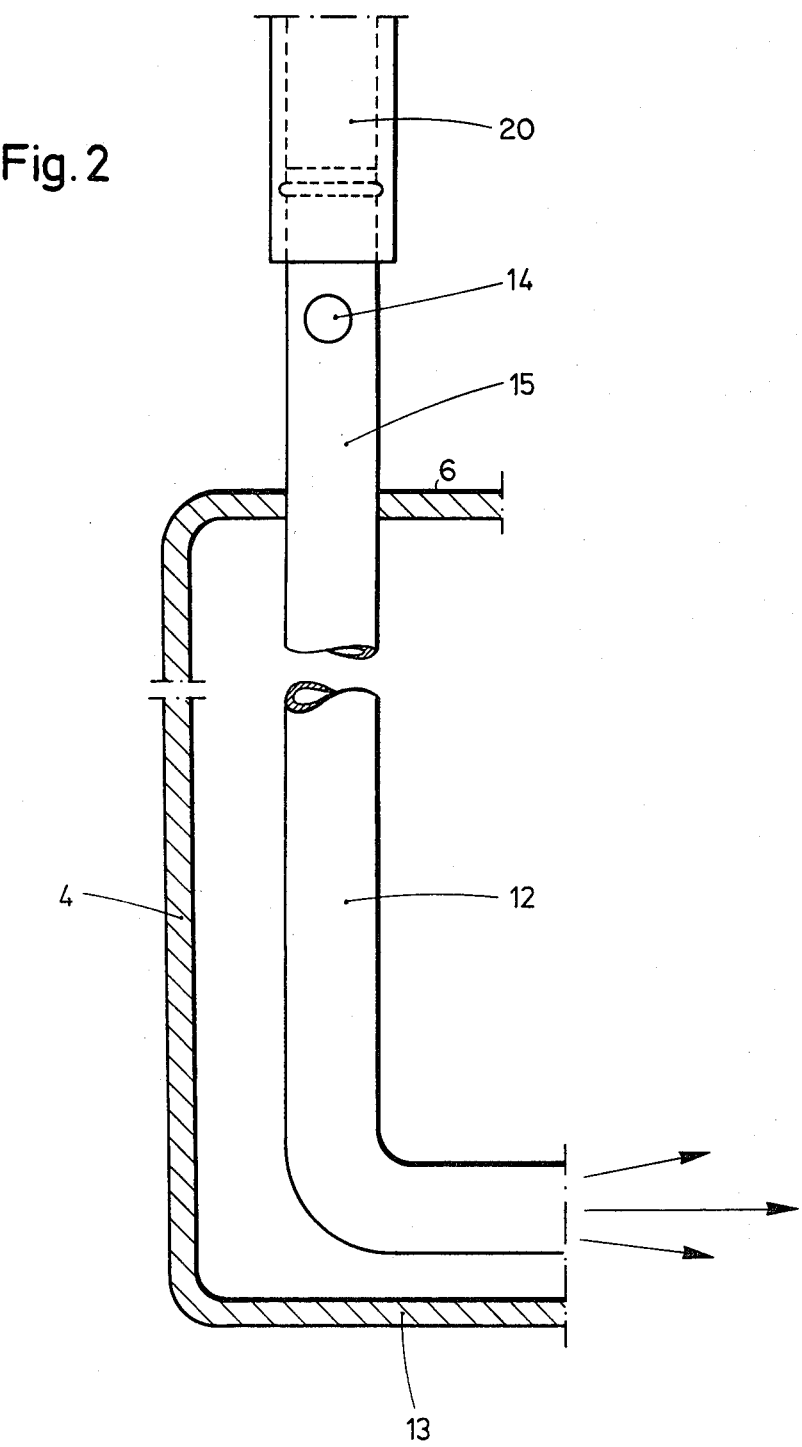

WATER-CLOSET FOR VEHICLES, PARTICULARLY MOTOR COACHES

This invention relates to a water-closet including a completely closed sewage container for receiving faecal matter and sewage therein, and provided with an overflow duct, for use in a vehicle, particularly a motor coach having a pressurized-air supply system including a bypass duct connected to the pressure regulator controlling the air pressure in a pressure tank, for exhausting the de-activating pressure.

Water-closets of this type are generally known. They serve a very important need. There exists, however, the problem of annoying odours. These odours are particularly annoying during emptying of the sewage container, which is usually carried out at motor coach service installations. These installations are generally provided with drain connections leading to the sewage system, so that the sewage container is usually emptied while other maintenance and service work is in progress.

It is thus an object of the invention to improve a known water-closet for a vehicle having a pressurized-air supply system including a bypass duct in such a manner, that the development of annoying odours within the sewage container is substantially prevented by simple and economical means.

For attaining this object, the invention provides that the bypass duct is extended to a point close to the bottom of the sewage container for aerating the faecal matter contained therein by admixture of the oxygen contained in the air.

The introduction of the practically freely available pressurized air into the faecal matter causes the decomposition thereof to take place practically without the development of annoying odours. The sewage container connected to the water closet may thus be emptied without the presence of odours. The aerated and thereby decomposed faecal matter is moreover less onerous to the environment than non-aerated and non-decomposed faecal matter or faecal matter treated with chemical deodorants. In comparison to water-closets requiring the employ of chemical deodorants, the water-closet according to the invention is thus not only substantially more economical, but also considerably simpler as regards its use and maintenance.

The invention shall now be described in detail with reference to an exemplary embodiment shown in the drawings, wherein FIG. 1 shows a diagrammatic representation of the pressurized-air ducting between a compressor and a sewage container, and FIG. 2 shows a sectional view of the sewage container and the bypass duct extended thereinto.

The pressurized-air supply system of a vehicle for the actuation of brakes, doors, ventilation flaps and the like conventionally includes a compressor, at least one pressure tank, a pressure regulator and the associated ducting including a bypass duct. During operation of the vehicle engine the compressor continuously supplies pressurized air to the pressure tank under the control of a pressure regulator and an activating and deactivating mechanism associated therewith. On attaining the operating pressure within the pressure tank, the pressure regulator causes the pressurized-air supply from the compressor to be discontinued, the deactivating pressure being exhausted through the bypass duct. The pressurized-air supply system is thus far generally known and requires no further explanation.

In accordance with the invention, means are provided for diverting the pressurized air generated by the compressor 1 while the pressure tank (not shown) is at its operating pressure by the pressure regulator 2 through a bypass duct 3 for continuously aerating the pool of faecal matter contained in a completely closed sewage container 4 which may optionally be provided with an overflow duct 5. As embodied, the means comprises a bypass duct 3 extending from the pressure regulator 2 is connected to a tube 21 and passes through the top wall 6 of the sewage container 4 in a fluid-tight fit, and extends to a point close to the bottom of the container, from where the pressurized air is dispersed throughout the pool of faecal matter. The practically continuous introduction of pressurized air from the bypass duct supplies the faecal matter in the pool with oxygen promoting the decomposition of the faecal matter while substantially suppressing the development fo annoying odours.

Since the introduction of the full deactivating pressure into the pool of faecal matter would result in a strong splashing about thereof, the bypass duct 3 is provided with a relief port measuring about 8 mm and venting to atmosphere via an additional exhaust duct 7. In the preferred embodiment shown, the bypass duct 3 is connected to a T-junction 8, one terminal of which is sized as the relief port and has the exhaust duct connected thereto.

In order to further promote the decomposition of the faecal matter within the sewage container, the latter may additionally be heated by employing the cooling water of the vehicle engine to this purpose.

Finally any annoying odours may be further reduced by additionally aerating the interior of the sewage container. To this effect a blower 9 is provided at a suitable location on the vehicle, with an intake duct 10 leading to the sewage container 4, and an exhaust duct 11 leading to atmosphere.

The water-closet embodying the invention may of course be used not only for land vehicles, but also for water- and airborne craft having a pressurized-air supply system.

The bypass duct connected to the pressure regulator 2 may also be formed by a corrosion and pressure resistant hose 20 as shown in FIG. 2. In this case the top wall 6 is fitted with an aeration duct 12 extending downwards through the sewage container 4 to a point adjacent the bottom 13 thereof, where it is angled off and extends further over a short distance. This permits an even more effective aeration of the pool of faecal matter to be achieved. In this embodiment, the relief port 14 for the bypass duct 3 is formed in the pipe socket 15 projecting above the top wall 6 and configured to have the end of the hose forming the bypass duct attached thereto in an airtight fit as by means of a hose clamp or the like.

What is claimed is:

1. In a water-closet for a vehicle including a completely closed sewage container for receiving faecal matter and sewage therein, said vehicle having a pressurized air supply system for operating brakes, doors, ventilation flaps and the like, said system including a compressor operable continuously during operation of the vehicle engine to supply pressurized air to a pressure tank, a pressure regulator for controlling the air pressure in the pressure tank, and a bypass duct connected to the regulator for exhausting excess air from the system when the pressure tank is at its operating pressure, the improvement comprising a tube extending into the container to a point close to the bottom of the container and connected to the bypass duct of the pressurized air supply system to continuously supply aerating air to said container during operation of the vehicle engine and when the pressure tank is at its operating pressure and to substantially continuously aerate faecal matter in said container during vehicle engine operation.

2. The water-closet of claim 1, wherein the bypass duct is provided with a relief port for controllably reducing the air pressure supplied to the sewage container.

3. The water closet of claim 1, which further includes a fan connected to said container by an intake duct and to the atmosphere by an exhaust duct for ventilating said container.

4. The water-closet of claim 1 wherein said container is adapted to be heated by the cooling water of said vehicle engine.

* * * * *